US010281997B2

(12) United States Patent
Kang et al.

(10) Patent No.: US 10,281,997 B2
(45) Date of Patent: May 7, 2019

(54) IDENTIFICATION OF AN OBJECT ON A TOUCH-SENSITIVE SURFACE

(71) Applicant: Hewlett-Packard Development Company, L.P., Houston, TX (US)

(72) Inventors: Jinman Kang, San Diego, CA (US); David Bradley Short, San Diego, CA (US); Ben Wynne, San Diego, CA (US); Amit A Marathe, San Diego, CA (US); Geoffrey C Mayne, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 4 days.

(21) Appl. No.: 15/514,650

(22) PCT Filed: Sep. 30, 2014

(86) PCT No.: PCT/US2014/058194
§ 371 (c)(1),
(2) Date: Mar. 27, 2017

(87) PCT Pub. No.: WO2016/053271
PCT Pub. Date: Apr. 7, 2016

(65) Prior Publication Data
US 2017/0220142 A1 Aug. 3, 2017

(51) Int. Cl.
*G06F 3/0354* (2013.01)
*G06F 3/044* (2006.01)
(Continued)

(52) U.S. Cl.
CPC ........ *G06F 3/03547* (2013.01); *G06F 3/0304* (2013.01); *G06F 3/044* (2013.01);
(Continued)

(58) Field of Classification Search
CPC ........................... G06F 3/03457; G06F 3/0304
See application file for complete search history.

(56) References Cited

U.S. PATENT DOCUMENTS 7,599,561 B2   10/2009   Wilson et al.
7,710,391 B2   5/2010    Bell et al.
(Continued)

FOREIGN PATENT DOCUMENTS

TW       201430683         8/2014
WO       WO-2013/008236 A1   1/2013
(Continued)

OTHER PUBLICATIONS

David Kim et al., "Retrodepth: 3D Silhouette Sensing for High-precision Input on and Above Physical Surfaces," CHI 2014, Apr. 26-May 1, 2014, pp. 1377-1386, ACM.
(Continued)

*Primary Examiner* — Lisa S Landis
(74) *Attorney, Agent, or Firm* — HP Inc. Patent Department

(57) ABSTRACT

Examples disclosed herein describe, among other things, a computing system. The computing system may include, for example, a touch-sensitive surface to obtain a capacitive signature representing an object disposed on the touch-sensitive surface, and a camera to obtain supplemental data representing the object. The system may also include an identification engine to obtain, based at least on the capacitive signature, identification data associated with the object, and to obtain, based at least on the supplemental data, at least one characteristic of the object.

19 Claims, 10 Drawing Sheets

(51) Int. Cl.
    *G06F 3/03*     (2006.01)
    *G06F 3/042*     (2006.01)
    *G06F 3/041*     (2006.01)
    *G06F 3/0488*     (2013.01)

(52) U.S. Cl.
    CPC .......... *G06F 3/0425* (2013.01); *G06F 3/0416* (2013.01); *G06F 3/04886* (2013.01); *G06F 2203/04106* (2013.01)

(56) References Cited

U.S. PATENT DOCUMENTS

| | | | |
|---|---|---|---|
| 7,874,681 | B2 | 1/2011 | Huebner |
| 8,121,640 | B2 | 2/2012 | Russ et al. |
| 8,199,117 | B2 | 6/2012 | Izadi et al. |
| 8,730,309 | B2 | 5/2014 | Wilson et al. |
| 8,736,583 | B2 | 5/2014 | Anderson et al. |
| 2005/0078092 | A1 | 4/2005 | Clapper |
| 2008/0018591 | A1 | 1/2008 | Pittel et al. |
| 2009/0174675 | A1 | 7/2009 | Gillespie et al. |
| 2011/0234539 | A1 | 9/2011 | Liao et al. |
| 2011/0242054 | A1 | 10/2011 | Tsu |
| 2011/0285666 | A1 | 11/2011 | Poupyrev et al. |
| 2011/0298589 | A1 | 12/2011 | Mcfarlane et al. |
| 2012/0262407 | A1 | 10/2012 | Hinckley et al. |
| 2012/0327044 | A1 | 12/2012 | Zeliff et al. |
| 2013/0033484 | A1 | 2/2013 | Liao et al. |
| 2013/0077236 | A1 | 3/2013 | Becze et al. |
| 2013/0106791 | A1* | 5/2013 | Tanaami ............... G06F 3/0425 345/175 |
| 2013/0182114 | A1 | 7/2013 | Zhang et al. |
| 2013/0234962 | A1 | 9/2013 | Chen et al. |
| 2013/0335405 | A1 | 12/2013 | Scavezze et al. |
| 2015/0324197 | A1* | 11/2015 | Lin ....................... G06F 9/3017 715/704 |

FOREIGN PATENT DOCUMENTS

| | | |
|---|---|---|
| WO | WO-2013019255 | 2/2013 |
| WO | WO-2013/108031 A2 | 7/2013 |
| WO | WO-2013/168996 A1 | 11/2013 |

OTHER PUBLICATIONS

Eun-Kyung Lee et al., "High-Resolution Depth Map Generation by Applying Stereo Matching Based on Initial Depth Information," 3DTV-CON'08, May 2008, 201-204, IEEE.

J. La Viola, Jr. et al~"3D Spatial Interaction: Applications for Art, Design, and Science," A SIGGRAPH 2011 Course, Aug. 7, 2011, pp. 1-75.

Shahram Izadi et al., "C-Slate: A Multi-Touch and Object Recognition System for Remote Collaboration using Horizontal Surfaces," 2007, pp. 3-10, IEEE.

* cited by examiner

IDENTIFICATION OF AN OBJECT ON A TOUCH-SENSITIVE SURFACE

BACKGROUND

Many computing systems today include at least one display and at least one input device. Example input devices include a mouse, a keyboard, a touch-sensitive surface capable of detecting physical objects that come into contact therewith, and the like.

BRIEF DESCRIPTION OF THE DRAWINGS

The following detailed description references the drawings, wherein.

DETAILED DESCRIPTION

Figure 1:
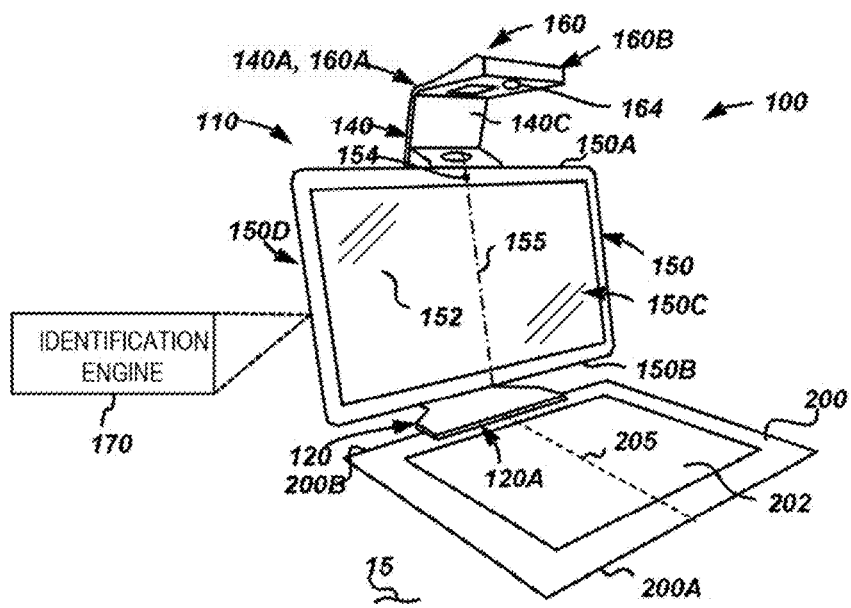
FIG. 1 is a schematic perspective view of an example computing system comprising an identification engine.

User experience of a user of a computing system may be enhanced by allowing the user to use, in conjunction with an application running on the computing system, movable physical objects such as game pieces, dice, or any other types of two-dimensional or three-dimensional physical objects. In such systems, it may be difficult for the computing system to identify the objects and determine their characteristics.

In some examples described herein, identification data and/or characteristics associated with one or more objects disposed on a touch-sensitive surface may be obtained. As described in more detail below, the identification data and the characteristics may be obtained based on a capacitive signature representing the object and/or based on supplemental data representing the object, such as image data, infrared data, depth data, and so forth. In some examples, the obtained identification data and/or characteristics associated with the object may be provided to and used by the software application to enhance user experience and enable additional features and functionalities.

In some examples described herein, a computing system is described. The computing system may include, for example, a touch-sensitive surface to obtain a capacitive signature representing an object disposed on the touch-sensitive surface, and a camera to obtain supplemental data representing the object. The system may also include an identification engine to obtain, based at least on the capacitive signature, identification data associated with the object, and to obtain, based at least on the supplemental data, at least one characteristic of the object.

Referring now to the drawings, FIGS. 1-7 are schematic views of an example computing system 100 comprising an identification engine 170. In the examples of FIGS. 1-7, system 100 may include a support structure 110, a computing device 150, a projector assembly 184, and a touch-sensitive surface 200. System 100 may also include a sensor bundle 164 pointed at touch-sensitive surface to capture one or more images representing an object disposed on touch sensitive surface 200. Computing device 150 may include an identification engine 170 to identify the object and/or obtain the object's characteristics.

Computing device 150 may comprise any suitable computing device complying with the principles disclosed herein. As used herein, a 'computing device' may comprise an electronic display device, a smartphone, a tablet, a chip set, an ail-in-one computer (e.g., a device comprising a display device that also houses processing resource(s) of the computer), a desktop, computer, a notebook computer, workstation, server, any other processing device or equipment, or a combination thereof. In this example, device 150 is an all-in-one computer having a central axis or center line 155, first or top side 150A, a second or bottom side 150B axially opposite the top side 150A, a front side 150C extending axially between sides 150A and 1508, a rear side 150D also extending axially between sides 150A and 1508 and generally radially opposite front side 150C. A display 152 is disposed along front side 150C and defines a viewing surface of computing system 100 to display images for viewing by a user of system 100. In examples described herein, a display may include components of any technology suitable for displaying images, video, or the like.

In some examples, display 152 may be a touch-sensitive display. In examples described herein, a touch-sensitive display may include, for example, any suitable technology (e.g., components) for displaying images, video, or the like, and may include any suitable technology (e.g., components) for detecting physical contact (e.g., touch input), such as, for example, a resistive, capacitive, surface acoustic wave, infrared (IR), strain gauge, optical imaging, acoustic pulse recognition, dispersive signal sensing, or in-cell system, or the like. In examples described herein, display 152 may be referred to as a touch-sensitive display 152. Device 150 may further include a camera 154, which may be a web camera, for example. In some examples, camera 154 may capture images of a user positioned in front of display 152. In some examples, device 150 may also include a microphone or other device to receive sound input (e.g., voice input from a user).

Figure 2:
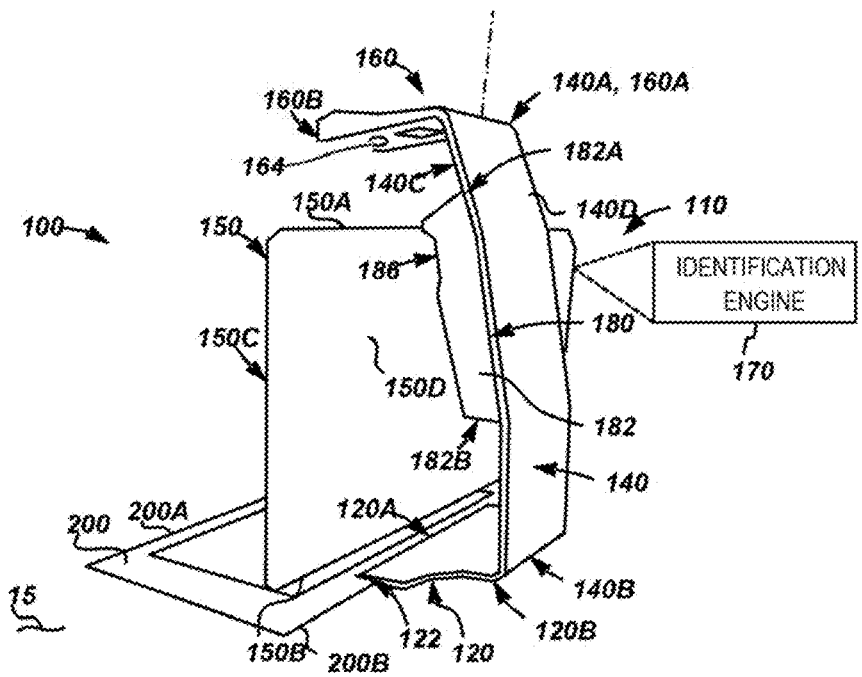
FIG. 2 is another schematic perspective view of the example computing system of FIG. 1.

In the example of FIGS. 1-7, support structure 110 includes a base 120, an upright, member 140, and a top 160. Base 120 includes a first or front end 120A, and a second or rear end 1208. Base 120 may engage with a support surface 15 to support the weight of at least a portion of the components of system 100 (e.g., member 140, unit 180, device 150, top 160, etc.). In some examples, base 120 may engage with support surface 15 in this manner when system 100 is configured for operation. In the example of FIGS. 1-7, front end 120A of base 120 includes a raised portion 122 that may be disposed above and separated from support surface 15 (creating a space or clearance between portion 122 and surface 15) when base 120 is disposed on support surface 15 as illustrated in FIG. 2, for example. In such examples, a portion of a side of touch-sensitive surface 200 may be disposed in (e.g., received within) the space formed between portion 122 and surface 15. In such examples, piecing a portion of surface 200 within the space created by portion 122 and surface 15 may assist with the proper alignment of surface 200. In other examples, other suitable methods or devices may be used to assist with the alignment of surface 200.

Upright member 140 includes a first or upper end 140A, a second or lower end 140B opposite the upper end 140A, a first or front side 140C extending between the ends 140A and 140B, and a second or rear side 140D opposite the front side 140C and also extending between the ends 140A and 140B. Lower end 140B of member 140 is coupled to rear end 120B of base 120, such that member 140 extends substantially upward from support surface 15.

Top 160 includes a first or proximate end 160A, a second or distal end 160B opposite the proximate end 160A, a top surface 160C extending between ends 160A and 160B, and a bottom surface 160D opposite the top surface 160C and also extending between ends 160A and 160B. Proximate end 160A of top 160 is coupled to upper end 140A of upright member 140 such that distal end 160B extends outward from upper end 140A of upright member 140. As such, in the example shown in FIG. 2, top 160 is supported at end 160A (and not at end 160B), and may be referred to herein as a cantilevered top In some examples, base 120, member 140, and top 160 may be monolithically formed. In other examples, two or more of base 120, member 140, and top 160 may be formed of separate pieces (i.e., not monolithically formed).

Touch-sensitive surface 200 may include a central axis or centerline 205, a first or front side 200A, and a second or rear side 200B axially opposite the front side 200A. Touch-sensitive surface 200 may comprise any suitable technology for detecting physical contact with surface 200 by an object such as hand or other objects (e.g., objects containing conductive material) whose placement on or close to surface 200 may cause a detectible change in capacitance or other parameters of surface 200. For example, touch-sensitive surface 200 may comprise any suitable technology for detecting (and in some examples tracking) one or multiple touch inputs by a user to enable the user to interact, via such touch input, with software being executed by device 150 or another computing device. As another example, touch-sensitive surface 200 may comprise any suitable technology for detecting (and in some examples tracking) one or multiple objects disposed on touch-sensitive surface 200 to enable the user to interact, via placement, rotation, movement, and other manipulations of such object(s), with software being executed by device 150 or another computing device.

In examples described herein, touch-sensitive surface 200 may be any suitable touch-sensitive planar (or substantially planar) object, such as a touch-sensitive mat, tabletop, sheet, etc. In some examples, touch-sensitive surface 200 may be disposed horizontally (or approximately or substantially horizontally). For example, surface 200 may be disposed on support surface 15, which may be horizontal (or approximately or substantially horizontal).

In some examples, all or substantially all of surface 200 may be capable of detecting touch input as described above. In other examples, less than all of surface 200 may be capable of detecting touch input as described above. For example, surface 200 may comprise a touch-sensitive region 202, extending over less than all of surface 200, wherein region 202 is capable of detecting touch input as described above. In other examples, region 202 may extend over substantially all of surface 200 (e.g., may be substantially coterminous with surface 200). Region 202 may be substantially aligned with axis 205.

As described above, surface 200 may be aligned with base 120 of structure 110 to assist with proper alignment of surface 200 (e.g., at least during operation of system 100). In the example of FIGS. 1-7, rear side 200E of surface 200 may be disposed between raised portion 122 of base 120 and support surface 15, such that rear end 200B is aligned with front side 120A of base 120 to assist with proper overall alignment of surface 200 (and particularly proper alignment of region 202) with other components of system 100. In some examples, surface 200 may be aligned with device 150 such that the center line 155 of device 150 is substantially aligned with center line 205 of surface 200. In other examples, surface 200 may be differently aligned with device 150.

In some examples, surface 200 and device 150 may be communicatively connected (e.g., electrically coupled) to one another such that user inputs received by surface 200 may be, communicated to device 150. Surface 200 and device 150 may communicate with one another via any suitable wired or wireless communication technology or mechanism, such as, for example, WI-FI, BLUETOOTH, ultrasonic technology, electrical cables, electrical leads, electrical conductors, electrical spring-loaded pogo pins with magnetic holding force, or the like, or a combination thereof. In the example of FIGS. 1-7, exposed electrical contacts disposed on rear side 200B of surface 200 may engage with corresponding electrical pogo-pin leads within portion 122 of base 120 to communicate information (e.g., transfer signals) between device 150 and surface 200 during operation of system 100. In such examples, the electrical contacts may be held together by adjacent magnets (located in the clearance between portion 122 of base 120 and surface 15) to magnetically attract and hold (e.g., mechanically) a corresponding ferrous and/or magnetic material disposed along rear side 200B of surface 200.

Figure 3:
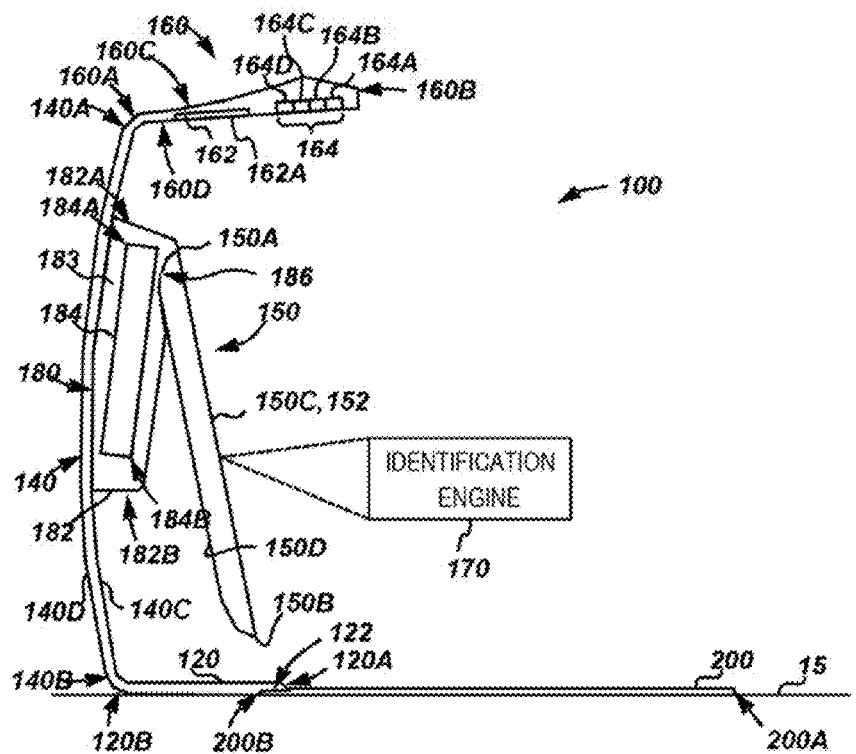
FIG. 3 is a schematic side view of the example computing system of FIG. 1.

Referring to FIG. 3, projector unit 180 comprises an outer housing 182, and a projector assembly 184 disposed within housing 182. Housing 182 includes a first or upper end 182A, a second or lower end 1828 opposite the upper end 182A, and an inner cavity 183. In the example of FIG. 3, housing 182 further includes a coupling or mounting member 186 to engage with and support device 150 (e.g., at least during operation of system 100). Member 186 may be any suitable mechanism or device for suspending and supporting any suitable computing device 150 as described herein. For example, member 186 may comprise a hinge that includes an axis of rotation such that device 150 may be rotated (e.g., by a user) about the axis of rotation to attain a desired angle for viewing display 152. In some examples, device 150 may permanently or semi-permanently attached to housing 182 of unit 180. In some examples, housing 180 and device 150 may be integrally or monolithically formed as a single unit.

Figure 4:
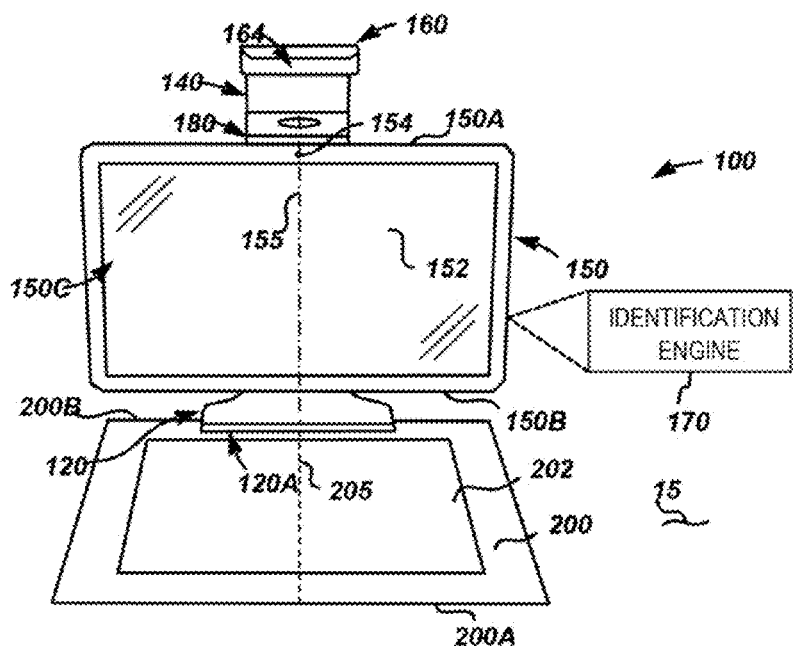
FIG. 4 is a schematic front view of the example computing system of FIG. 1.

Referring to FIG. 4, in some examples, when device 150 is suspended from structure 110 via mounting member 186 on housing 182, projector unit 180 (i.e., both housing 182 and assembly 184) may be substantially hidden behind device 150 when system 100 is viewed from the front (i.e., substantially facing display 152 disposed on front side 150C of device 150). In addition, as shown in FIG. 4, when device 150 is suspended from structure 110 as described above, projector unit 160 (i.e., both housing 182 and assembly 184) and any image projected thereby may be substantially aligned or centered with respect to center line 155 of device 150

Referring again to FIG. 3, projector assembly 184 is disposed within cavity 183 of housing 182, and includes a first or upper end 164A, a second or lower end 184B opposite the upper end 184A. Upper end 184A is proximate upper end 182A of housing 182 while lower end 184B is proximate lower end 182B of housing 182. Projector assembly 184 may comprise any suitable digital light projector assembly for receiving data from a computing device (e.g., device 150) and projecting image(s) (e.g., out of upper end 184A) that correspond with that input data. For example, in some implementations, projector assembly 184 may comprise a digital light processing (DLP) projector or a liquid crystal on silicon (LCOS) projector which are advantageously compact and power efficient projection engines capable of multiple display resolutions and sizes, such as, for example, standard XGA resolution (1024×768 pixels) with a 4:3 aspect ratio, or standard WXGA resolution (1280×800 pixels) with a 16:10 aspect ratio. Projector assembly 184 is further communicatively connected (e.g., electrically coupled) to device 150 in order to receive data therefrom and to produce (e.g., project) light and image(s) from end 184A based on the received data. Projector assembly 184 may be communicatively connected to device 150 via any suitable type of electrical coupling, for example, or any other suitable communication technology or mechanism described herein. In some examples, assembly 184 may be communicatively connected to device 150 via electrical conductor(s), WI-FI, BLUETOOTH, an optical connection, an ultrasonic connection, or a combination thereof. In the example of FIGS. 1-7, device 150 is communicatively connected to assembly 184 through electrical leads or conductors (e.g., as described above in relation to surface 200 and base 120) disposed within mounting member 186 such that, when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162A that is disposed along bottom surface 160D of top 160 and is positioned to reflect light, image(s), etc., projected from upper end 184A of projector assembly 184 toward surface 200 during operation Mirror 162 may comprise any suitable type of mirror or reflective surface. In the example of FIGS. 1-7, fold mirror 162 may comprise a standard front surface vacuum metalized aluminum coated glass mirror that acts to fold light emitted from assembly 184 down to surface 200. In other examples, mirror 162 may have a complex aspherical curvature to act as a reflective lens element to provide additional focusing power or optical correction.

Sensor bundle 164 includes at least one sensor (e.g., camera, or other type of sensor) to detect, measure, or otherwise acquire data based on the state of (e.g., activities occurring in) a region between sensor bundle 164 and surface 200. The state of the region between sensor bundle 164 and surface 200 may include object(s) on and/or over surface 200, or activities occurring on and/or near surface 200. In the example of FIG. 3, bundle 164 includes an RGB camera (or image sensor) 164A, an IR camera (or IR sensor) 164B, a depth camera (or depth sensor) 164C, and an ambient light sensor 164D. In examples described herein, a camera may be referred to as a "sensor".

In some examples, RGB camera 164A may be a camera to capture color images (e.g., at least one of still images and video). In some examples, RGB camera 164A may be a camera to capture images according to the RGB color model, which may be referred to herein as "RGB images". It is appreciated, however, that in other examples, RGB camera 164A may be a camera to capture image according to other color models, such as YUV, YCbCr, RAW, and so forth. In some examples, RGB camera 164A may capture images with relatively high resolution, such as a resolution on the order of multiple megapixels (MPs), for example. As an example. RGB camera 164A may capture color (e.g., RGB) images with a resolution of 14 MPs. In other examples, RBG camera 164A may capture images with a different resolution. In some examples, RGB camera 164A may be pointed toward surface 200 and may capture image(s) of surface 200, object(s) disposed between surface 200 and RGB camera 164A (e.g., on or above surface 200), or a combination thereof.

IR camera 164B may be a camera to detect intensity of IR light at a plurality of points in the field of view of the camera 164B. In examples described herein, IR camera 164B may operate in conjunction with do IR light projector 166 (see FIG. 7) of system 100 to capture IR images. In such examples, each IR image may comprise a plurality of pixels each representing an intensity of IR light detected at a point represented by the pixel. In some examples, top 160 of system 100 may include an IR light projector 166 (see FIG. 7) to project IR light 167 toward surface 200 and IR camera 164B may be pointed toward surface 200. In such examples, IR camera 164B may detect the intensity of IR light reflected by surface 200, object(s) disposed between surface 200 and IR camera 164B (e.g., on or above surface 200), or a combination thereof. In some examples, IR camera 164B may exclusively detect IR light 167 projected by IR light projector 166 (e.g., as reflected from surface 200, object(s), etc., or received directly).

Depth camera 164C may be a camera (sensor(s), etc.) to detect the respective distance(s) (or depth(s)) of portions of object(s) in the field of view of depth camera 164C. As used herein, the data detected by a depth camera may be referred to herein as "distance" or "depth" data. In examples described herein, depth camera 164C may capture a multi-pixel depth image (e.g., a depth map), wherein the data of each pixel represents the distance or depth (measured from camera 164C) of a portion of an object at a point represented by the pixel. Depth camera 164E may be implemented using any suitable technology, such as stereovision camera(s), a single IR camera sensor with a uniform flood of IR light, a dual IR camera sensor with a uniform flood of IR light, structured light depth sensor technology, time-of-flight (TOF) depth sensor technology, or a combination thereof. In some examples, depth sensor 164C may indicate when an object (e.g., a three-dimensional object) is on surface 200. In some examples, depth sensor 164O may detect at least one of the presence, shape, contours, motion, and the respective distance(s) of an object (or portions thereof) placed on surface 200.

Ambient light sensor 164D may be arranged to measure the intensity of light in the environment surrounding system 100. In some examples, system 100 may use the measurements of sensor 164D to adjust other components of system 100, such as, for example, exposure settings of sensors or cameras of system 100 (e.g., cameras 164A-164C), the intensity of the light emitted from light sources of system 100 (e.g., projector assembly 184, display 152, etc.), or the like.

In some examples, sensor bundle 164 may omit at least one of sensors 164A-164D. In other examples, sensor bundle 164 may comprise other camera(s), sensor(s), or the like in addition to sensors 164A-164D, or in lieu of at least one of sensors 164A-164D. For example, sensor bundle 164 may include a user interface sensor comprising any suitable device(s) (e.g., sensor(s), camera(s)) for tracking a user input device such as, for example, a hand, stylus, pointing device, etc. In some examples, the user interface sensor may include a pair of cameras which are arranged to stereoscopically track the location of a user input device (e.g., a stylus) as it is moved by a user about the surface 200 (e.g., about region 202 of surface 200). In other examples, the user interface sensor may additionally or alternatively include IR camera(s) or sensor(s) arranged to detect infrared light that is either emitted or reflected by a user input device. In some examples, sensor bundle 164 may include a gesture camera to detect the performance of predefined gestures by object(s) (e.g., hands, etc.). In some examples, the gesture camera may comprise a depth camera and additional functionality to detect, track, etc., different types of motion over time.

In examples described herein, each of sensors 164A-164D of bundle 164 is communicatively connected (e.g., coupled) to, device 150 such that data generated within bundle 164 (e.g., images captured by the cameras) may be provided to device 150, and device 150 may provide commands to the sensor(s) and camera(s) of sensor bundle 164. Sensors 164A-164D of bundle 164 may be communicatively connected to device 150 via any suitable wired or wireless communication technology or mechanism, examples of which are described above. In the example of FIG. 1-7, electrical conductors may be routed from bundle 164, through top 160, upright member 140, and projector unit 180 and into device 150 through leads that are disposed within mounting member 186 (as described above).

Figure 5:
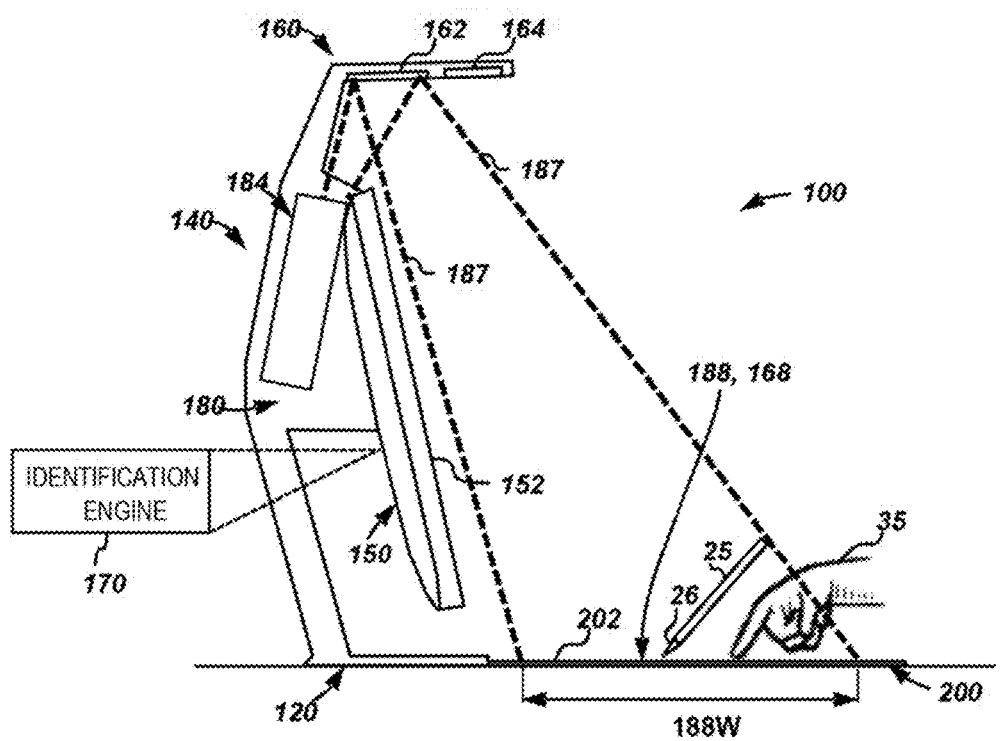
FIG. 5 is a schematic side view of the example computing system of FIG. 1 during an example operation.
Figure 6:
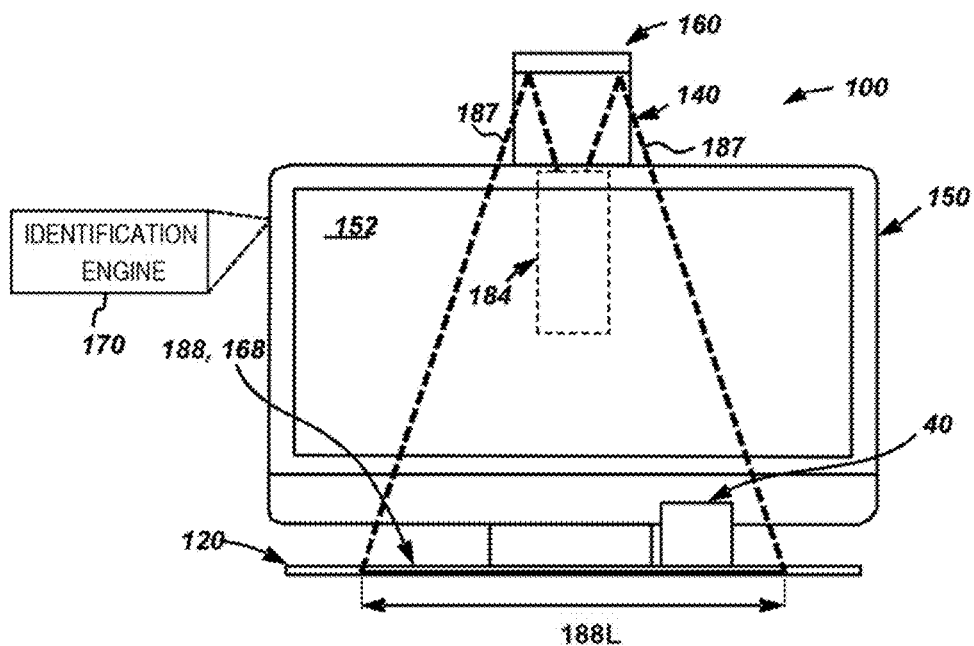
FIG. 6 is a schematic front view of the example computing system of FIG. 1 during another example operation.

Referring to FIGS. 5 and 6, during operation of system 100, projector assembly 184 may project visible right 187 to reflect off of mirror 162 towards surface 200 to thereby display visible image(s) on>a projector display space 188 of surface 200. In the example of FIGS. 5-6, space 188 may be substantially rectangular, having a length 188L and a width 188W. In some examples, length 188L may be approximately 16 inches, while width 188W may be approximately 12 inches. In other examples, length 188L and width 188W may have different values.

Figure 7:
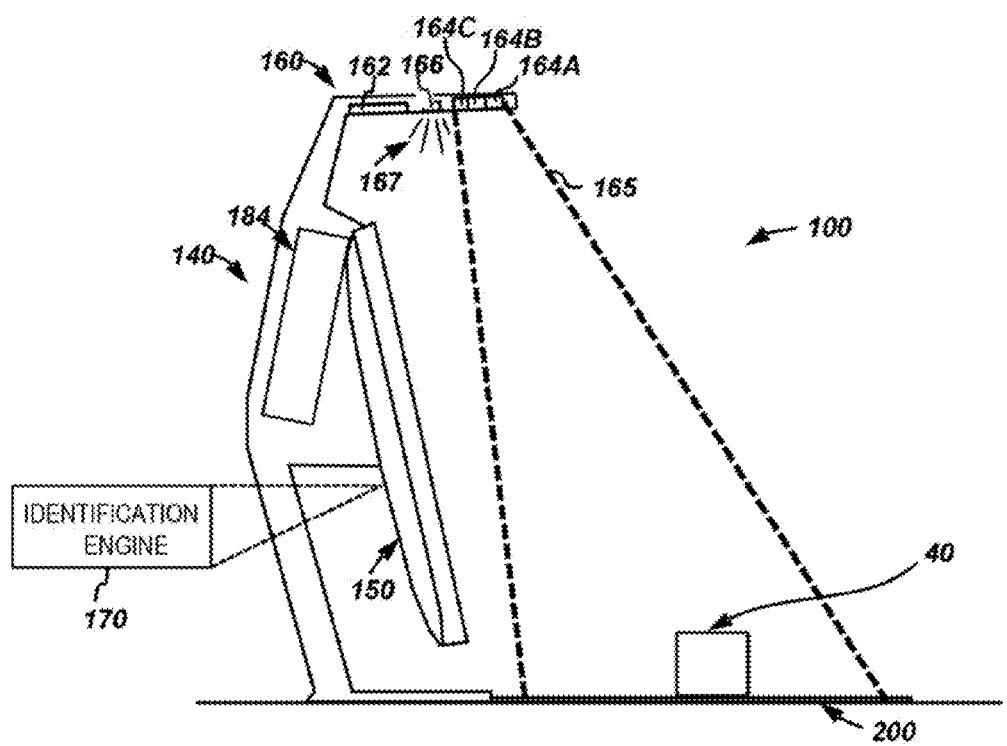
FIG. 7 is a schematic side view of the example computing system of FIG. 1 illustrating an example of image capturing.

In some examples, cameras of sensor bundle 164 (e.g., cameras 164A-164C) are arranged within system 100 such that the field of view of each of the cameras includes a space 168 of surface 200 that may overlap with some or all of display space 188, or may be coterminous with display space 188. In examples described herein, the field of view of the cameras of sensor bundle 164 (e.g., cameras 164A-164C) may be said to include space 168, though at times surface 200 may be at least partially occluded by object(s) on or over surface 200. In such examples, the object(s) on or over surface 200 may be in the field of view of at least one of cameras 164A-164C. In such examples, sensors, of sensor bundle 164 may acquire data based on the state of (e.g., activities occurring in, object(s) disposed in) a region between sensor bundle 164 and space 168 of surface 200. In some examples, both space 188 and space 168 coincide or correspond with region 202 of surface 200 such that functionalities of touch-sensitive region 202, projector assembly 184, and sensor bundle 164 are all performed in relation to the same defined area. A field of view 165 of the cameras of sensor bundle 164 (e.g., cameras 164A-164C) is schematically illustrated in FIG. 7. In some examples, each of the cameras of sensor bundle 164 (e.g., cameras 164A-164C) may have a slightly different field of view.

Referring now to FIGS. 5-7, device 150 may direct, projector assembly 184 to project image(s) onto surface 200 (e.g., onto region 202). Device 150 may also display image(s) on display 152 (which may be the same as or different than the image(s) projected onto region 202 by projector assembly 184). The image(s) projected by assembly 184 may comprise information and/or images produced by software being executed by device 150. In some examples, a user may interact with the image(s) projected on surface 200 and displayed on display 152 by physically engaging touch-sensitive surface 200 in any suitable manner, such as with user's hand 35 (e.g., via touches, taps, gestures, or other touch input), with a stylus 25, or via any other suitable user input device(s). As described above, touch-sensitive surface 200 may detect such interaction via physical engagement with surface 200. Also, in some examples, projector assembly 184 may also project image(s) (at least partially) on objects disposed over surface 200 (e.g., hand 35, as shown in FIG. 5).

As an example, when a user interacts with touch-sensitive surface 200 via physical contact, surface 200 may generate touch input information and>provide it to device 150 through any suitable connection (examples of which are described above). In some examples, the OS may pass the received touch input to another application (e.g., program, etc.) executing on device 150. In response, the executing OS or application may alter image(s) projected by projector assembly 184, image(s) displayed on display 152, or a combination thereof. As used herein, an "application", "computer application", or "service" is a collection of machine-readable instructions that are executable by a processing resource. In some examples, a user may similarly interact with image(s) displayed on display 152 (which may be a touch-sensitive display), or any other input device of device 150 (e.g., a keyboard, mouse, etc.).

In some examples, sensors (e.g., cameras) of sensor bundle 164 may also generate system input which may be provided to device 150 for further processing. For example, system 100 may utilize camera(s) of bundle 164 to detect at least one of the presence and location of a user's hand 35 (or a stylus 25, as shown in FIG. 5), and provide system input information representing the detected information to device 150. The provided system input information may be passed to at least one of an OS and application being executed by device 150, and may alter image(s) displayed by system 100, as described above in relation to touch input. For example, bundle 164 may include a pair of cameras or sensors that are arranged to perform stereoscopic stylus tracking (e.g., of stylus 25). In other examples, stylus 25 includes a tip 26 coated with an infrared retro-reflective coating (e.g., paint) such that tip 26 may serve as an infrared retro-reflector. In such examples, bundle 164 may include IR camera(s) (or sensor(s)), as described above, which detect IR light that is reflected off tip 26 to enable device 150 to track the location of tip 26 as it moves across region 202. In some examples, surface 200 (with image(s) projected on it by assembly 184) may serve as a second or alternative touch-sensitive display within system 100. In addition, detection of interaction with image(s) displayed on surface 200 may be enhanced through use of sensors of sensor bundle 164 as described above.

In some examples, system 100 may capture two-dimensional (2D) image(s) or create a three-dimensional (3D) scan of a physical object such that an image of the object may then be projected onto surface 200 for further use and manipulation thereof. For example, as shown in FIG. 6, an object 40 may be placed on surface 200 such that sensors of bundle 164 (e.g., at least one of cameras 164A-164C) may detect at least one of the location, dimensions, and color of object 40, to enhance the 2D image(s) or create the 3D scan thereof. In such examples, the information, gathered by the sensors of bundle 164 may be provided to device 150 (e.g., an OS, application, service, etc., of device 150), as described above. In some examples, after receiving the information, device 150 (e.g., the OS, application, service, etc.) may direct projector assembly 184 to project an image of object 40 onto surface 200. Object 40 may be, for example, a game piece, a die, a smartphone, a book, a mug, a pen, a document, a photo, or any other two-dimensional or three-dimensional physical object. Object 40 may also be, for example, a wedge-shaped object having at least one side that faces the user (and away from display 152) and that may be projected upon, for example, by projector assembly 184.

Figure 8:
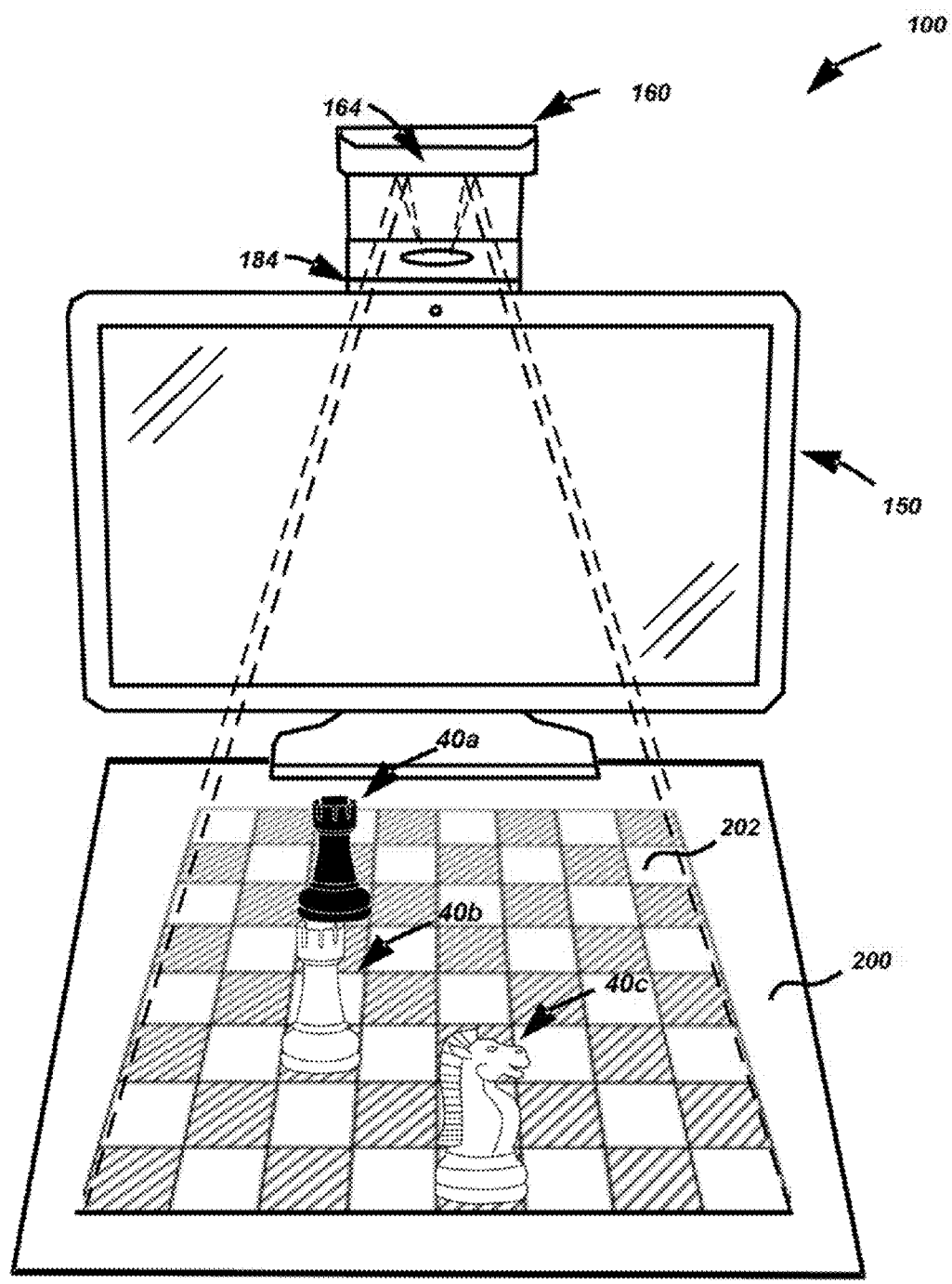
FIG. 8 is another schematic perspective view of he example computing system of FIG. 1.

In some examples, as described above, the user may interact with a software application being executed by device 150 using one or more objects disposed on touch-sensitive surface 200. For example, as illustrated in FIG. 8, computer system 100 may project (e.g., using projector assembly 184) an image representing a chess board onto touch-sensitive region 202 of touch-sensitive surface 200, and the user may place objects 40a, 40b, and 40c corresponding to different chess pieces on surface 200, using the projected image as a guide for the possible locations at which to place the objects, As described above, touch-sensitive surface 200 may detect one or more objects that come in contact therewith, in some examples, surface 200 (or computing device 150) may generate a capacitance map (e.g., a two-dimensional array), in which each value may correspond to the detected capacitance level at a particular location (e.g., pixel) on surface 200. In some examples, when an object is placed on surface 200, it may cause a change in capacitance levels measured at the area of surface 200 that is substantially under the object. The measured capacitance levels may reflect the shape and the materials of the object, especially the bottom portion surface of the object, e.g., the portion or surface that touches surface 200. In some examples, high conductivity materials may correspond to higher measured capacitance levels than low conductivity materials. Accordingly, in some examples, each object placed on surface 200 may be represented by its own capacitive signature on the capacitance map, where the signature may correspond to the shape and materials of the bottom portion or surface of the object.

In some examples, an object may include a capacitive pattern, which may be a part of the object, or attached to, embedded in, or otherwise coupled to object (e.g., to the object's bottom portion). In some examples, the capacitive pattern may be a high-conductivity (e.g., metal) coating being applied to the bottom surface of the object. In other examples, the capacitive pattern may be a material layer permanently or detachably coupled to the bottom surface of the object, such as a thin label adhesively attached to the bottom surface. The layer may include at least two areas having different degrees of conductivity.

Figure 9A:
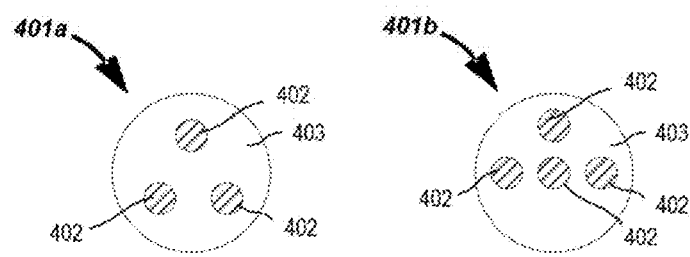
FIG. 9A illustrates example capacitive patterns of an object.

For example, FIG. 9A illustrates two example capacitive patterns 401a and 401b. In this example, the bottom surfaces are circular, although it is appreciated that the object's bottom surface can be of any shape. In this example, surfaces 401a and 401b have first areas 403 and second areas 402, where second areas 402 include materials having higher conductivity (e.g., metal) than materials included in first areas 403 (e.g., paper, wood, plastic, etc.) In some examples, first area 403 may be the bottom surface of the object, and second areas 402 may be coated onto or adhesively coupled to the bottom surface. In other examples, first area 403 and second areas 402 may be portions of the same label, or of different labels attached to each other. In some examples, an object may have more than one surface with a capacitive signature, e.g., if the object can be placed on two or more of its surfaces. For example, a cube-shaped object (e.g., a die) may have six different sides, where each side may have a different capacitive pattern (e.g., each pattern may correspond to the pattern of dots on the die).

In some examples, a plurality of capacitive patterns may be designed such that each capacitive pattern is distinct from other capacitive patterns irrespective of the rotation of the rotation or orientation of the capacitive pattern. Some patterns (e.g., 401b) may have a rotational symmetry of order 1, meaning that rotating the pattern by a certain degree (other than a multiple of 360 degrees) will result in a different pattern. For such patterns, computing system 100 may determine the degree of rotation and the orientation of the pattern relative to surface 200 based on the capacitive signature measured by surface 200. Other patterns (e.g., 401a) may have a rotational symmetry of order N>1, meaning that rotating the pattern around its center by 360/N degrees will result in the same pattern. For such patterns, computing system 100 may determine the degree of rotation up to a certain degree (e.g., 60 degrees).

Figure 9B:
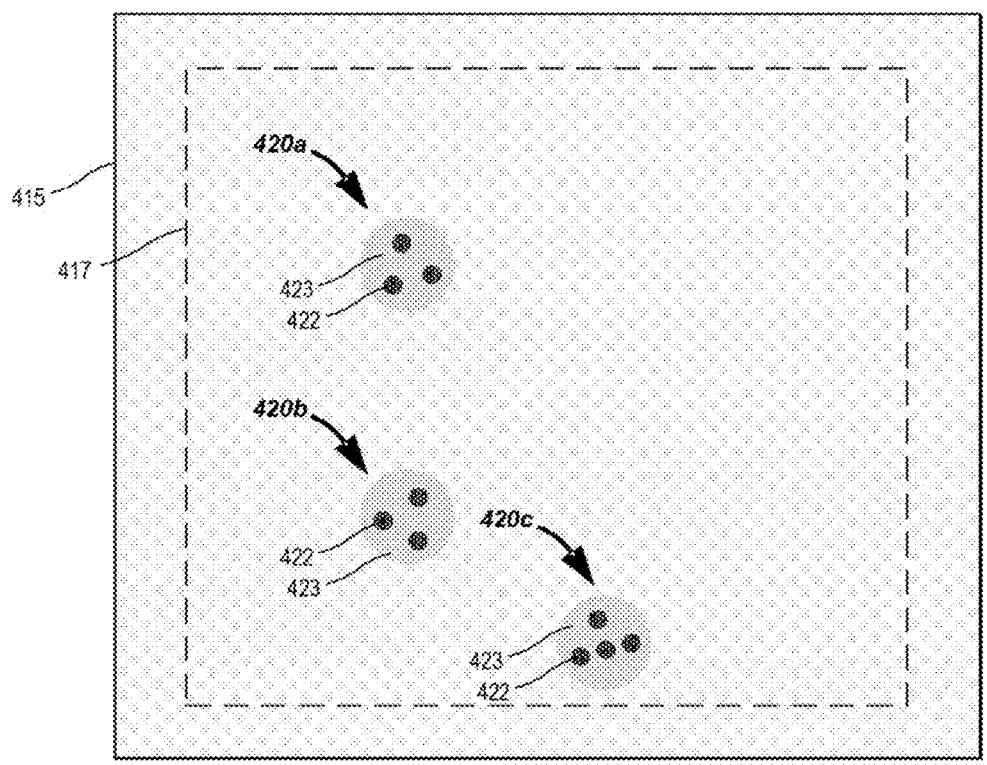
FIG. 9B illustrates an example capacitance map of a touch-sensitive surface of the example computing system of FIG. 1.

In some examples, objects of the same type, class, or category may have the same capacitive pattern and objects of different types may have different capacitive patterns selected, for example, from a plurality of capacitive patterns. For example, as illustrated in FIGS. 8 and 9B, rooks 40a and 40b may have capacitive pattern 401a, and knight 40c may have capacitive pattern 401b. As described below, this may allow distinguishing between the different types, classes, or categories of objects based on their capacitive patterns, as represented by their capacitive signatures measured by surface 200.

Referring now to FIG. 9B in conjunction with FIG. 8 and FIG. 9A, FIG. 8B illustrates a capacitance map 415 generated as a result of placing objects 40a, 40b, and 40c on surface 200 as shown in the example of FIG. 8. Capacitance map 415 includes an area 417 corresponding to touch-sensitive region 202 onto which the chess board is projected. Capacitance map 415 may include a capacitive signature 420a corresponding to capacitive pattern 401a of object 40a; a capacitive signature 420b corresponding to capacitive pattern 401a of object 40b; and an example capacitive signature 420c corresponding to capacitive pattern 401b of object 40c.

As shown in FIG. 9B, the capacitive signatures may include first portions 422 corresponding to the first areas 402 of the corresponding objects, and second portions 423 corresponding to the second areas 403 of the corresponding objects. Because, as described above, first areas 402 may include materials having higher conductivity (e.g., metal), while second areas 403 may include materials having lower conductivity (e.g., paper, wood, plastic, etc.), first portions 422 may be characterized by higher measured capacitance values than second portions 423. As also illustrated in FIG. 9B, capacitive signatures 420a, 420b, and 420c may reflect the rotation and orientation of their respective objects 40a, 40b, and 40c.

Figure 10:
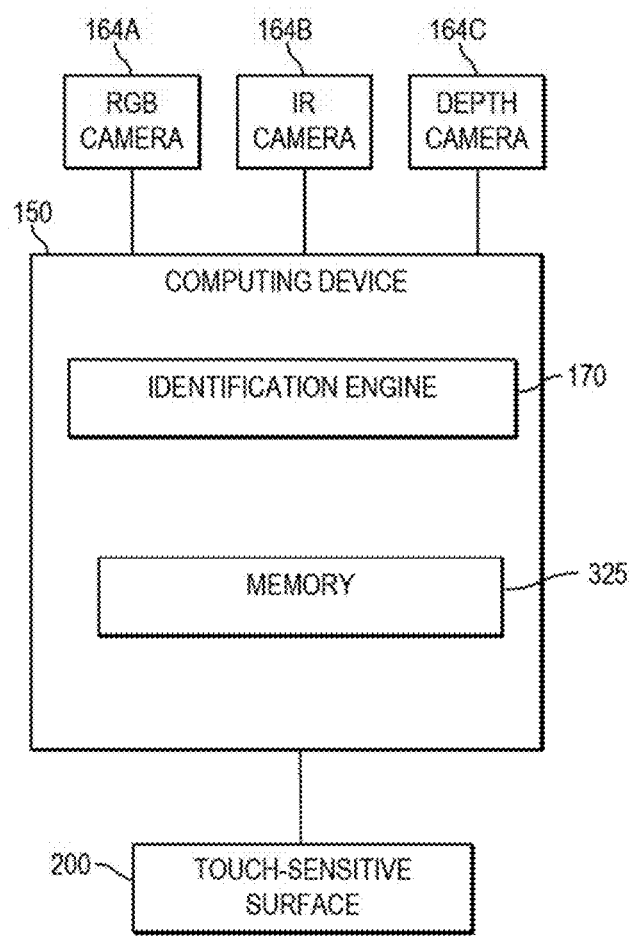
FIG. 10 is a block diagram of an example computing device of the example computing system of FIG. 1.

FIG. 10 is a block diagram of a portion of computing system 100 of FIG. 1 comprising identification engine 170.

In particular, FIG. 10 illustrates an example of computing device 150 that comprises identification engine 170 and a memory 325, and is communicatively connected to at least one camera (e.g., camera 164A) of sensor bundle 164 (as described above) and touch-sensitive surface 200, as described above. Although not shown in FIG. 10, computing device 150 may also be communicatively connected to other components of system 100, as described above, Computing device 150 (or any other computing device implementing identification engine 170) may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

As noted above, in the example of FIG. 10, computing device 150 comprises identification engine 170. In other examples, identification engine 170 may comprise additional engine(s). In examples described herein, any engine(s) of computing device 150 (e.g., engine 170) may be any combination of hardware and programming to implement the functionalities of the respective engine. Such combinations of hardware and programming may be implemented in a number of different ways. For example, the programming may be processor executable instructions stored on a non-transitory machine-readable storage medium (e.g., memory 325) and the hardware may include a processing resource to execute those instructions. In such examples, the machine-readable storage medium may store instructions that, when executed by the processing resource, implement the engines. The machine-readable storage medium storing the instructions may be integrated in the same computing device (e.g., device 150) as the processing resource to execute the instructions, or the machine-readable storage medium may be separate from but accessible to the computing device and the processing resource. The processing resource may comprise one processor or multiple processors included in a single computing device or distributed across multiple computing devices.

In some examples, the instructions can be part of an installation package that, when installed, can be executed by the processing resource to implement the engines of system 100. In such examples, the machine-readable storage medium may be a portable medium, such as a compact disc, DVD, or flash drive, or a memory maintained by a server from which the installation package can be downloaded and installed. In other examples, the instructions may be part of an application or applications already installed on a computing device including the processing resource (e.g., device 150). In such examples, the machine-readable storage medium may include memory such as a hard drive, solid state drive, or the like.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, a DVD, etc.), and the like, or a combination thereof. Further, any machine-readable storage medium described herein may be non-transitory.

Referring still to FIG. 10, identification engine 170 may obtain a capacitive signature of at least one object disposed on surface 200. As described above, the capacitive signature may be a part of a capacitance map, which may be received (e.g., in a wired or wireless manner) from surface 200 or generated by identification engine 170 based on signals received from surface 200. As also described above, the capacitive signature may correspond to or be associated with a capacitive pattern included in or coupled to the object disposed on surface 200, where the capacitive pattern may include at least a first area and a second area, where the areas may be characterized by different conductivities.

Based at least on the obtained capacitive signature of the object, identification engine 170 may obtain identification data associated with the object. The identification data may include information describing, for example, the object's type, class, category, sub-category, name, serial number, model number, manufacturer name, or any other information associated with the object. In some examples, engine 170 may obtain identification data by accessing a memory, such as memory 325. In some examples, memory 325 may be stored on computing device 150. In other examples, memory 325 may be stored on another computing device that may be accessed by computing device 150 (e.g., via a network such as the Internet).

Figure 11:
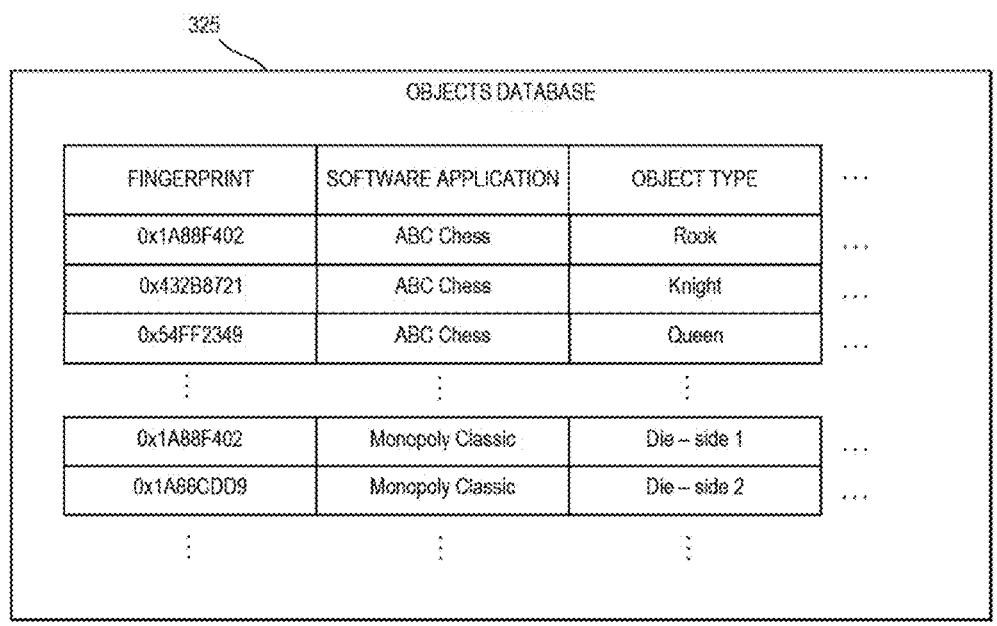
FIG. 11 illustrates an example portion of a memory.

In some examples, memory 325 may include identification information associated with a plurality of objects, where the information may be arranged in any suitable manner. For example, memory 325 may include a plurality of records, where each record may be associated with a particular object (e.g., white rook object 40b) or a class or category to which the object belongs (e.g., a white rook, a rook, a white chess piece, a game piece of a particular game, etc.). Furthermore, in examples where an object may have more than one surface with a capacitive signature, each record may be associated with, a particular surface of an object, as illustrated in the example of FIG. 11. In some examples, each record may also be associated with a software application (e.g., by specifying a unique application identifier). This may allow to distinguish between similar pieces associated with different applications.

In some examples, the record may also include a capacitive signature associated with the object. The capacitive signature may be generated and published by the manufacturer of the object or the developer of the software application, or generated by the user (e.g., by placing the object on surface 200 and storing the measured signature). In some examples, in order to improve performance and/or save storage space, the record may not store the entire capacitive signature; instead, the record may store a representative fingerprint of the capacitive signature, which may be, for example, a numerical value generated based on the capacitive signature, a scaled-down image (e.g., a thumbnail) of the capacitive signature, and the like.

In some examples, each record in memory 325 may include a unique capacitive signature or fingerprint (hereinafter sometimes collectively referred to as a "capacitive signature" for brevity). In other examples, the signatures or fingerprints may not be unique in the context of the entire memory 325, but they may be unique within the context of any records associated with a particular software application.

FIG. 11 illustrates an example portion of memory 325 having records (indicated as rows), where each record is associated with an object or a surface of an object, and includes identification data that identifies at least the software application (e.g., "ABC Chess" and "Monopoly Classic"), object type (e.g., "Rook," "Knight," "Queen," "Die—side 1," and "Die—side 2"), and the object's signature (fingerprint). As described above, each signature or fingerprint may be unique across the entire memory or, as illustrated in the example of FIG. 11, it may be unique across all entries associated with the same software application (e.g., fingerprint 0x1A88F402 is associated with two different objects but those objects are associated with different software applications).

Referring back to FIG. 10, as described above, identification engine 170 may obtain identification data associated with the object based at least on the capacitive signature of the object obtained from surface 200 (hereinafter, "measured signature"). In some examples, engine 170 obtains the identification data by finding, within memory 325, a record associated with the same signature (hereinafter, "stored signature") as the measured signature. If the records store fingerprints (hereinafter, "stored fingerprints") of the signatures and not the entire signatures, engine 170 may first generate a fingerprint of the measured signature (hereinafter, "measured fingerprint") using the same method as the stored fingerprints were generated, and find the record that has the same stored fingerprint as the measured fingerprint.

In some examples, the fingerprints may be generated based on the signatures using a method that is independent of the signature's rotation or orientation. For example, the fingerprint may be a numeric value calculated based on a number of portions 422, their shapes, distances between them, and any other parameters that are independent of the absolute locations of portions 422 within capacitive signatures 420. In these cases, engine 170 may find a stored fingerprint that matches the measured fingerprint.

In other examples, however, the generated fingerprints may depend on the signatures' orientation. In these examples, engine 170 may generate several measured fingerprints, each corresponding to a different orientation of the signature, and try to find a stored fingerprint that matches at least one of the generated measured fingerprints. Similarly if memory 325 stores entire capacitive signatures as opposed to their signatures, engine 170 may generate several versions of measured signature, each version corresponding to a different orientation of the signature. Engine 170 may then find a stored signature that matches at least one of the signatures. This may also allow engine 170 to determine the degree of rotation of the object relative to the default rotation of the stored signature. To determine whether a stored signature matches a measured signature (or any rotated versions thereof), engine 170 may compare the signatures using a pixel-to-pixel image comparison of the entire signatures or parts thereof, or using any other suitable method.

As described above, in some examples, there may be two or more stored signatures or fingerprints within memory 325 that match a given measured signature. In such examples, engine 170 may find the record that has a stored signature matching the measured signature and that is also associated (e.g., via a software application identifier) with a particular software application, e.g., with the software application that is currently running on computing device 150. For example, if the measured fingerprint is 0x1A88F402, engine 170 may find the record associated with the object "Rook" if computing device 150 is executing a software application identified as "ABC Chess." If, however, computing device 150 is executing a software application identified as "Monopoly Classic," engine 170 may find the record associated with the object "Die—side 1," In some examples, instead of finding the record based on an application that is being executed on computing device 150, engine 170 finds the record based on an application that is being executed and is currently active (e.g., whose window is currently in focus, or, with whom the user had the last interaction). After finding the record, engine 170 may obtain from the record identification data associated with the object.

As described above, based on the obtained identification data, engine 170 may identify (e.g., uniquely) the object, the type of the object, one or more categories or subcategories to which the object belongs, or any other identification information. While the above examples describe identifying a single object, it is appreciated that the any number of objects simultaneously disposed on surface 200 may be similarly identified. As mentioned above, the capacitive signature (e.g., in conjunction with the capacitance map) may be used by engine 170 not only for identifying the object but also, for example, for determining object's characteristics, such as the object's location on surface 200, the object's orientation, and the like.

In some examples, engine 170 may obtain supplemental data from one or more cameras of sensor bundle 164. Supplemental data may include, for example, image data representing the object, where the image data may be obtained from RGB camera 164A, from camera 154, or from any other camera suitable for capturing image data representing the object. Supplemental data may also include infrared data representing the object, where the infrared data may being obtained, for example, from IR camera 164b or from any other camera suitable for capturing infrared data representing the object. Supplemental data may also include depth data representing the object, where the depth data may be obtained, for example, from depth camera 164c or from any other camera suitable for capturing depth data representing the object. Thus, supplemental data may include any combination of one or more of image data, infrared data, depth data, or any other types of data representing the object.

Based on the supplemental data, engine 170 may determine some object characteristics with higher accuracy that may be determined based solely on capacitive signatures and capacitance map. For example, engine 170 may calibrate the capacitance map to correlate (e.g., spatially) with the image data, the infrared data, and or the depth data, if those are not already calibrated. Engine 170 may then combine the information from the capacitance map and one or more of image data, infrared data, and depth data, to generate a combined data, by utilizing the advantages of each type of data.

For example, depth data may provide an accurate representation of the contours of an object because depth data may be unaffected by any light (e.g., visible or infrared) incident or projected upon the object. However, the depth data may not be able to accurately represent objects or parts thereof that have very small (e.g., unmeasurable) height above surface 200.

Infrared data, on the other hand, may accurately represent the objects (e.g., their shapes, temperatures, etc.) irrespective of their heights and irrespective of any visible light incident upon the objects. In some examples, in order to increase the contrast between the object and surface 200 as represented by the infrared data, surface 200 may be covered or coated with material, coating, or paint that increases the surface's absorption and decreases its reflection of infrared light, at least in the spectrum of infrared light captured by the infrared camera (e.g., IR camera 164b). Thus, surface 200 may be designed to reflect less infrared light, on average, than an object disposed on surface 200.

Image data may be affected by visible light incident on the object (e.g., projected by projector bundle 184), but unlike the infrared data and the depth data it may represent the object's colors and may also have a higher resolution than some other types of data. And as discussed above, the capacitance map and the capacitive signatures may provide accurate representation of the object's location on surface 200, its rotation around its central axis, the shape of its bottom surface, and the like.

Accordingly, in some examples, engine 170 may combine venous types of supplemental data (e.g., image data, infrared data, and depth data) with each other and/or with the capacitance map to generate a combined data, thereby leveraging the advantages and compensating for the deficiencies of each type of data, in such examples, engine 170 may determine the objects characteristics based on the combined data, where the characteristics may include, for example, the objects color(s), shape, dimensions (e.g., height), contours, location on surface 200, orientation, rotation, temperature, material composition, and so forth.

In some examples, engine 170 may use the characteristics derived based on the supplemental data to supplement the identification data and more accurately identify the object. For example, the identification data may only identify the object as a rook, without specifying the rook's color. In such a case, the color may be determined as part of the object characteristics obtained based on the combined data. In some examples, the identification data and/or the object characteristics may be provided to and used by a software application (e.g., the active application that is being executed by computing device 150). The application may use the identification data and/or object characteristics to enhance user experience, for example, by allowing the user to use physical objects for gaming, presentation, modelling, interaction, and any other suitable purpose.

Figure 12:
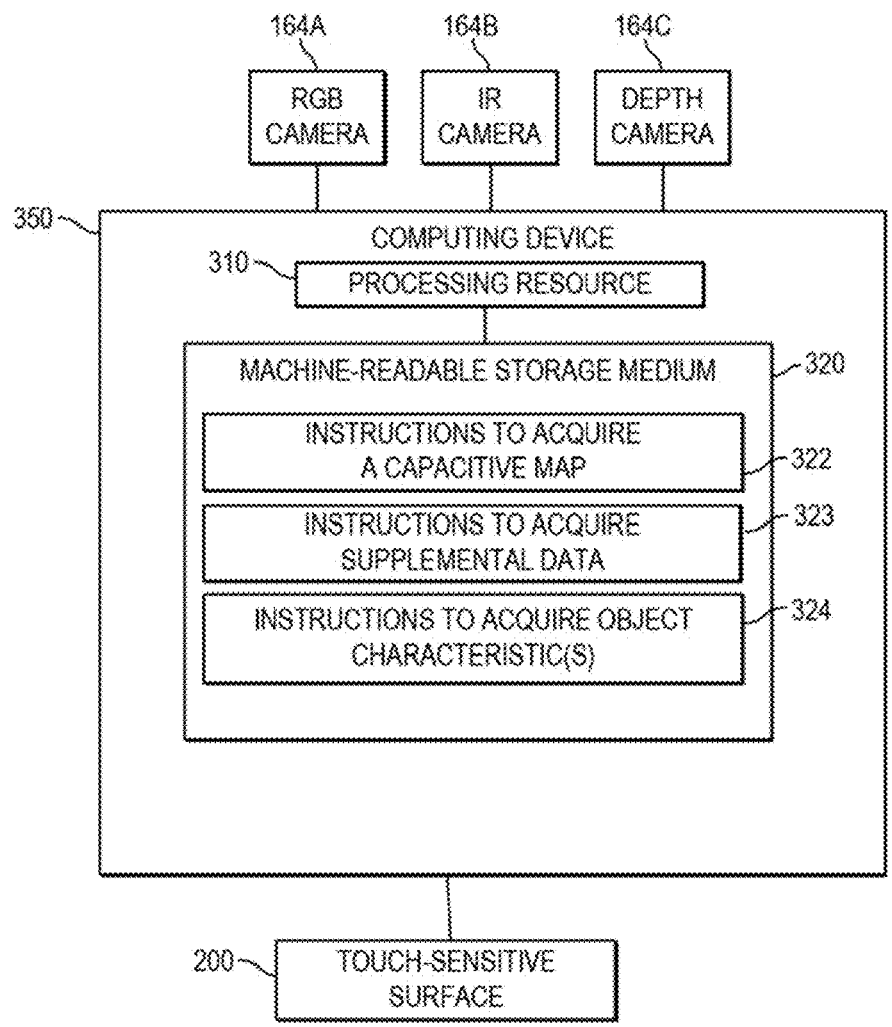
FIG. 12 is a block diagram of another example computing device of the example computing system of FIG. 1.

FIG. 12 is a block diagram of another example computing device 150. In the example of FIG. 12, computing device 150 is communicatively connected to touch-sensitive surface 200>and cameras 164A-164C, as described above. Each of cameras 164A-164C may be disposed above and pointed at surface 200. Computing device 150 may further include a processing resource 310 and a machine-readable storage medium 320 comprising (e.g., encoded with) instructions 322-324.

In some examples, storage medium 320 may include additional instructions, in other examples, instructions 322-324 and any other instructions described herein in relation to storage medium 320, may be stored on a machine-readable storage medium remote from but accessible to computing device 150 and processing resource 310. Processing resource 310 may fetch, decode, and execute instructions stored on storage medium 320 to implement the functionalities described herein. In other examples, the functionalities of any of the instructions of storage medium 320 may be implemented in the form of electronic circuitry, in the form of executable instructions encoded on a machine-readable storage medium, or a combination thereof. Machine-readable storage medium 320 may be a non transitory machine-readable storage medium.

In some examples, instructions 322 may acquire a capacitance map that may include one or more capacitive signatures corresponding to one or more objects disposed on surface 200, as described above. Instructions 322 may acquire the capacitance map from surface 200 or generate the capacitance map based on signals received from surface 200.

Instructions 323 may, in some examples, acquire from one or more cameras of sensor bundle 164, supplemental data representing the object(s), as described above instructions 324 may then acquire one or more characteristics of the object based at least on the acquired capacitive signature and the supplemental data. That is, while in some examples, as described above, object characteristics may be acquired based on supplemental data without the use of capacitive signature, in other examples, the combination of the capacitive signature and the supplemental data may be used to acquire one or more characteristics of the object, such as the object's orientation, rotation, location, dimensions, and other characteristics, as described above.

As mentioned above, storage medium 320 may also include additional instructions, such as instructions to obtain identification data (e.g., from memory 325 which may or may not a part of storage medium 320), where the identification data may include at least a name or an ID of a category to which the object belongs, as described above. In some examples, features and functionalities described herein in relation to FIG. 12 may be provided in combination with features and functionalities described herein in relation to any of FIGS. 1-11 and 13.

Figure 13:
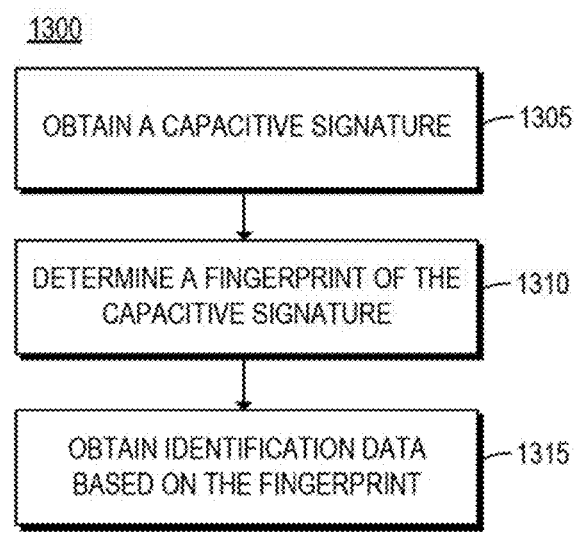
FIG. 13 is a flowchart of an example method for obtaining identification data associated with an object.

FIG. 13 is a flowchart of an example method 1300 for obtaining identification data associated with the object. Method 1300 may be performed, for example by at least one computing system (e.g., computing system 100) having at, least one computing device (e.g., computing device 150) having at least one processing resource (e.g., processing resource 310), or by any other combination of hardware and/or software processors, computing devices and/or computing systems.

At block 1305, method 1300 may obtain a capacitive signature representing an object disposed on a touch-sensitive surface (e.g., surface 200), as described in detail above. At block 1310, the method may determine a fingerprint of the obtained capacitive signature, as also described above. At block 1315, the method may obtain, at least based on the fingerprint, identification data associated with the object. As described above, the identification data may be obtained, for example, from a memory such as memory 325. In some examples, the method may include additional functionalities (not shown in FIG. 13). For example, the method can also obtain supplemental data and obtain objects characteristics based on the supplemental data, as described above.

Although the flowchart of FIG. 13 shows a specific order of performance of certain functionalities, method 1300 is not limited to that order. For example, the functionalities shown in succession in the flowchart may be performed in a different order, may be executed concurrently or with partial concurrence, or a combination thereof. In some examples, features and functionalities described herein in relation to FIG. 13 may be provided in combination with features and functionalities described herein in relation to any of FIGS. 1-12.

What is claimed is:

1. A computing system comprising:
   a processor;
   a touch-sensitive surface to obtain a capacitive signature representing an object disposed on the touch-sensitive surface;
   a camera to obtain supplemental data representing the object; and
   a non-transitory storage medium storing instructions executable on the processor to:

obtain, based on the capacitive signature, identification data that identifies a type of the object disposed on the touch-sensitive surface, obtain, based on the supplemental data, a characteristic of the object disposed on the touch-sensitive surface, the characteristic of the object being in addition to the identification data that identifies the type of the object, and identify the object based on the identified type of the object and the obtained characteristic.

2. The computing system of claim 1, wherein:

the camera comprises at least one of: an RGB camera, an infrared camera, or a depth camera; and the supplemental data comprises at least one of: image data representing the object, infrared data representing the object,) or depth data representing the object.

3. The computing system of claim 1, wherein the characteristic of the object comprises at least one of the object's color, shape, dimension, orientation, or material composition.

4. The computing system of claim 3, wherein the characteristic is obtained based on the supplemental data and the capacitive signature from the touch-sensitive surface.

5. The computing system of claim 1, wherein the capacitive signature represents a capacitive pattern coupled to the object.

6. A method performed by a system comprising a hardware processor, comprising:

obtaining a capacitive signature representing an object disposed on a touch-sensitive surface;

based on the obtained capacitive signature, obtaining, from stored information in a memory, identification data that identifies a type of object disposed on the touch-sensitive surface, the stored information correlating different representations of capacitive signatures to different types of objects;

receiving supplemental data representing the object from a camera;

obtaining, based on the supplemental data, a characteristic of the object disposed on the touch-sensitive surface, the characteristic of the object being in addition to the identification data; and identifying the object based on the characteristic of the object and the identified type of the object.

7. The method of claim 6, wherein the supplemental data comprises at least one of: image data representing the object, infrared data representing the object, or depth data representing the object.

8. The method of claim 6, wherein the characteristic of the object comprises at least one of the object's color, shape, dimension, orientation, or material composition.

9. A non-transitory machine-readable storage medium comprising instructions executable by a processing resource of a computing system comprising a touch-sensitive surface and a camera, the instructions executable to:

acquire, from the camera, supplemental data representing an object disposed on the touch-sensitive surface;

acquire, from the touch-sensitive surface, a capacitance map comprising a capacitive signature representing the object disposed on the touch-sensitive surface;

based on the supplemental data, obtain a characteristic of the object disposed on the touch-sensitive surface;

obtain, from stored information correlating different representations of capacitive signatures to different types of objects, identification data that identifies a type of the object disposed on the touch-sensitive surface, the identification data being in addition to the characteristic of the object and identify the object based on the characteristic of the object and the identified type of the object.

10. The non-transitory machine-readable storage medium of claim 9, wherein:

the camera comprises at least one of: an RGB camera, an infrared camera, or a depth camera; and the supplemental data comprises at least one of: i) image data representing the object, ii) infrared data representing the object, or depth data representing the object.

11. The computing system of claim 1, further comprising a memory to store information that correlates stored representations of capacitive signatures to corresponding different identification data that identify respective different types of objects, and the instructions are executable on the processor to obtain the identification data by:

comparing a representation of the capacitive signature from the touch-sensitive surface to the stored representations of capacitive signatures, and retrieving an identification data from the stored information, the retrieved identification data correlated to a stored representation of a capacitive signature, from among the stored representations of capacitive signatures, that matches the representation of the capacitive signature from the touch-sensitive surface.

12. The computing system of claim 11, wherein the representation of the capacitive signature from the touch-sensitive surface is a fingerprint of the capacitive signature from the touch-sensitive surface.

13. The computing system of claim 11, wherein the representation of the capacitive signature from the touch-sensitive surface is the capacitive signature from the touch-sensitive surface.

14. The computing system of claim 11 wherein the stored information further correlates the stored representations of capacitive signatures to a program, wherein the instructions are executable on the processor to:

identify the program based on the correlating of the representation of the capacitive signature from the touch-sensitive surface to the program by the stored information, and send the obtained identification data and the obtained characteristic to the identified program that performs the identifying of the object based on the identified type of the object and the obtained characteristic.

15. The method of claim 6, wherein the stored information further correlates a first subset of the different representations of capacitive signatures to a first program, the method further comprising:

identifying the first program based on the stored information correlating a representation of the obtained capacitive signature to the first program; and sending the obtained identification data and the obtained characteristic of the object to the identified first program that performs the identifying of the object based on the characteristic of the object and the identified type of the object.

16. The method of claim 15, wherein the stored information further correlates a second subset of the different representations of capacitive signatures to a second program different from the first program.

17. The method of claim 15, wherein the representation of the obtained capacitive signature is the obtained capacitive signature or a fingerprint of the obtained capacitive signature.

18. The non-transitory machine-readable storage medium of claim 9, wherein the stored information further correlates a first subset of the different representations of capacitive signatures to a first program, the instructions executable to further:
- identify the first program based on the stored information correlating a representation of the capacitive signature representing the object to the first program; and
- send the obtained identification data and the obtained characteristic of the object to the identified first program that performs the identifying of the object based on the characteristic of the object and the identified type of the object.

19. The non-transitory machine-readable storage medium of claim 18, wherein the stored information further correlates a second subset of the different representations of capacitive signatures to a second program different from the first: program.

* * * * *

UNITED STATES PATENT AND TRADEMARK OFFICE
CERTIFICATE OF CORRECTION

PATENT NO. : 10,281,997 B2
APPLICATION NO. : 15/514650
DATED : May 7, 2019
INVENTOR(S) : Jinman Kang et al.

Page 1 of 1

It is certified that error appears in the above-identified patent and that said Letters Patent is hereby corrected as shown below:

In the Claims

In Column 17, Line 16, Claim 2, delete "object,)" and insert -- object, --, therefor.

In Column 18, Line 3, Claim 9, delete "object and" and insert -- object; and --, therefor.

In Column 18, Line 36, Claim 14, after "claim 11" insert -- , --.

In Column 19, Line 18, Claim 19, delete "first:" and insert -- first --, therefor.

Signed and Sealed this
Sixth Day of August, 2019

Andrei Iancu
*Director of the United States Patent and Trademark Office*